(12) United States Patent
Colley

(10) Patent No.: US 7,711,483 B2
(45) Date of Patent: May 4, 2010

(54) DEAD RECKONING SYSTEM

(75) Inventor: Jaime B. Colley, Laguna Niguel, CA (US)

(73) Assignee: SiRF Technology, Inc., San Jose, CA (US)

( * ) Notice: Subject to any disclaimer, the term of this patent is extended or adjusted under 35 U.S.C. 154(b) by 731 days.

(21) Appl. No.: 11/531,957

(22) Filed: Sep. 14, 2006

(65) Prior Publication Data

US 2010/0076681 A1    Mar. 25, 2010

Related U.S. Application Data

(60) Provisional application No. 60/736,946, filed on Nov. 15, 2005.

(51) Int. Cl.
*G01C 21/26* (2006.01)
*G06F 19/00* (2006.01)

(52) U.S. Cl. .................. 701/217; 701/213; 701/220; 342/357.02

(58) Field of Classification Search .......... 701/217, 701/216, 220, 213; 702/189, 153, 151; 73/1.27
See application file for complete search history.

(56) References Cited

U.S. PATENT DOCUMENTS

| | | | | |
|---|---|---|---|---|
| 5,422,817 A * | 6/1995 | Tazartes et al. | ................ | 702/93 |
| 5,890,093 A * | 3/1999 | Mark et al. | .................. | 701/220 |
| 5,928,309 A * | 7/1999 | Korver et al. | ................ | 701/214 |
| 6,282,496 B1 * | 8/2001 | Chowdhary | .................. | 701/220 |
| 6,285,954 B1 * | 9/2001 | Mark et al. | .................. | 701/221 |
| 6,647,352 B1 * | 11/2003 | Horton | ........................ | 702/151 |
| 6,782,315 B2 * | 8/2004 | Lu et al. | ........................ | 701/45 |
| 7,248,964 B2 * | 7/2007 | Bye | ........................... | 701/200 |
| 7,286,933 B2 * | 10/2007 | Cho | ........................... | 701/216 |
| 7,337,650 B1 * | 3/2008 | Preston et al. | ............... | 73/1.38 |
| 2002/0022924 A1 * | 2/2002 | Begin | .......................... | 701/207 |
| 2004/0036650 A1 | 2/2004 | Morgan | | |

FOREIGN PATENT DOCUMENTS

WO    WO 00/17607 A1    3/2000
WO    WO 02/18873 A2    3/2002

OTHER PUBLICATIONS

PCT Search Report Mar. 15, 2007.

* cited by examiner

*Primary Examiner*—Tan Q. Nguyen
(74) *Attorney, Agent, or Firm*—Haynes & Boone, LLP.

(57) ABSTRACT

In one embodiment, a system and method of dead reckoning navigation for a vehicle uses a set of accelerometers. Sensed accelerometers from the set are converted into a vehicle body frame of reference set of accelerations. The resulting converted accelerations are then used to determine a dead-reckoning longitudinal acceleration for the vehicle. By integrating the longitudinal acceleration along a heading for the vehicle, a dead-reckoning-determined location for the vehicle is provided.

14 Claims, 3 Drawing Sheets

DEAD RECKONING SYSTEM

RELATED APPLICATION

This application claims the benefit of U.S. Provisional Application No. 60/736,946, filed Nov. 15, 2005, the contents of which are incorporated by reference.

FIELD OF INVENTION

The disclosed embodiments relate to positioning systems and methods. More particularly, the disclosed embodiments relate to determining position using a dead reckoning technique.

BACKGROUND

Satellite-based positioning systems such as Global Positioning System (GPS) are commonly integrated into automobiles to offer drivers navigation assistance. The assistance a GPS-guided navigation system can offer, however, depends upon successful receipt of GPS signals. In general, successful receipt of GPS signals depends upon line-of-sight contact with a plurality (three or more) of GPS satellites. Tall buildings often surround roads in urban areas creating artificial canyons that block successful reception. In addition, a driver may have entered an enclosed area such as a tunnel or parking garage that also prevents successful reception. Despite the lack of good reception, drivers continue to need navigation updates during these periods.

To provide navigation updates in the absence of GPS signal reception, a variety of dead reckoning enhancements have been offered as adjuncts to GPS navigation systems. Navigation using dead reckoning involves calculating a current position based upon the heading and distance from a previously known position. Dead reckoning has been used since ancient times in nautical applications prior to the development of celestial navigation. Sailors would use estimates of their speed and heading over a period of time to determine the relative change in position with regard to a previously-known position (such as a port) and thus deduce their current location.

In more modern applications such as automotive navigations systems, a dead reckoning system may get its necessary velocity measurements through a coupling to the car's odometer. However, such coupling involves considerable expense, particularly in an after-market application. Thus, dead reckoning systems have been developed that use accelerometers to provide velocity estimates from the integration of the acceleration. A problem remains, however, because the accelerometers must be precisely arranged with respect to the car to provide an accurate velocity estimate, thereby requiring an expensive and time-consuming installation.

Accordingly, there is a need in the art for improved dead reckoning systems that address these problems in the prior art.

SUMMARY

In accordance with an aspect of the invention, a method of dead reckoning navigation for a vehicle is provided that includes: determining an orientation between the sensor frame of reference and a body frame of reference for the vehicle using sensed accelerations from the accelerometers; and determining a longitudinal acceleration for the vehicle by converting sensed accelerations from the accelerometers according to the determined orientation between the sensor frame of reference and the body frame of reference.

In accordance with another aspect of the invention, a vehicle navigation system is provided that includes: a set of accelerometers operable to sense accelerations for the vehicle according to a sensor frame of reference; a GPS navigation system operable to determine a reference longitudinal acceleration for the vehicle; and a processor operable to calculate an orientation between the sensor frame of reference and a vehicle frame of reference using sensed accelerations from the set of accelerometers and to provide a set of converted accelerations and to calculate a dead-reckoning longitudinal acceleration for the vehicle using the converted accelerations.

In accordance with another aspect of the invention, a system is provided that includes: means for sensing accelerations for a vehicle according to a sensor frame of reference; and means for converting the sensed accelerations into a vehicle frame of reference to provide converted accelerations and calculating a dead-reckoning longitudinal acceleration for the vehicle using the converted accelerations.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

Figure 1:
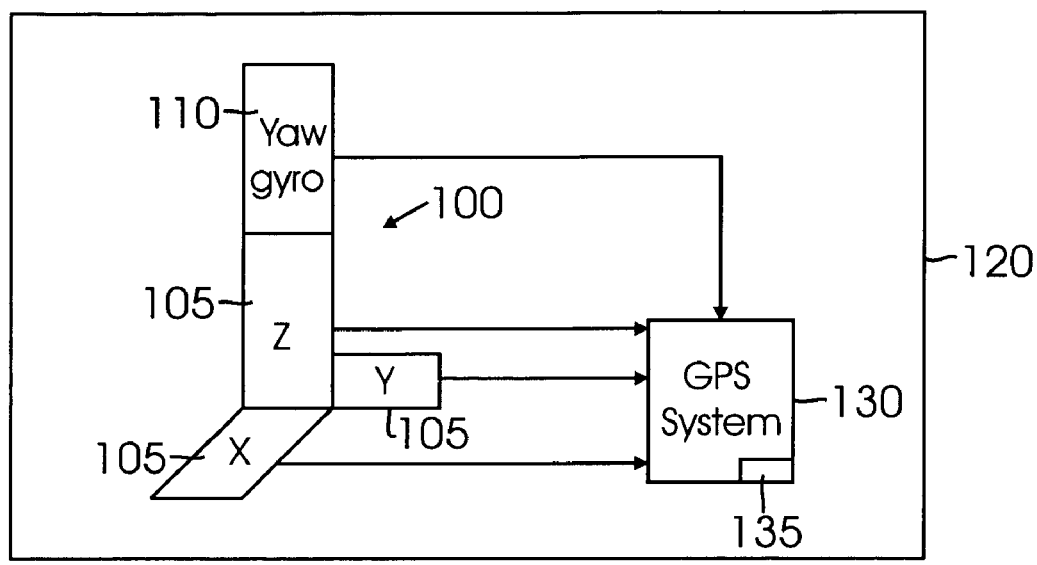
FIG. 1 is a block diagram of a dead reckoning (DR) system in accordance with an embodiment of the invention.

Turning now to FIG. 1, a block diagram of an exemplary dead reckoning (DR) system 100 is illustrated. DR system 100 includes orthogonal X, Y, and Z accelerometers 105. Each accelerometer 105 may be either a dual or triple axis accelerometer as known in the art. In addition, DR system 100 includes a yaw-rate gyroscope (gyro) 110 oriented substantially vertically with respect to an automobile or other vehicle (illustrated conceptually by block 120) having a GPS navigation system 130.

As will be explained further herein, accelerometers 105 may be used to provide an estimate of the longitudinal velocity of the vehicle. Heading is obtained by integrating the yaw rate from yaw-rate gyro 110. Those of ordinary skill will appreciate that conventional techniques may be used to convert the yaw-rate signal from gyro 110 into an actual yaw-rate for the vehicle. The following discussion will assume that the yaw-rate from gyro 110 has been converted in this fashion.

Figure 2:
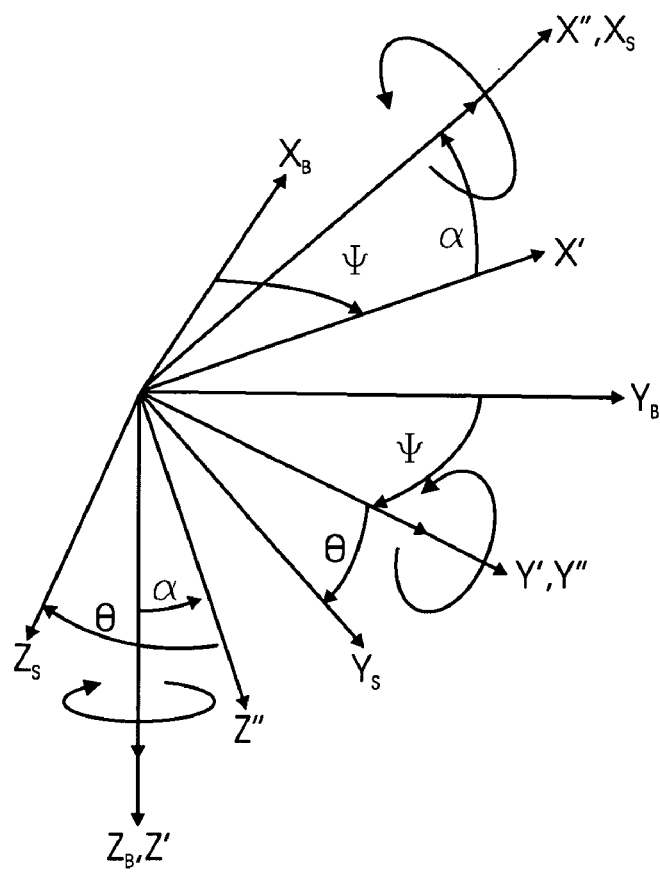
FIG. 2 illustrates the relationship between a body frame of reference and a sensor frame of reference for the DR system of FIG. 1.

Thus, the GPS navigation system may update its position subsequent to GPS signal reception loss by integrating through heading and longitudinal velocity estimates obtained from dead reckoning system 100. Advantageously, accelerometers 105 need not be precisely aligned with the vehicle. To better understand how dead reckoning system 100 provides relatively accurate position updates without requiring precision alignment of accelerometers 105 to the vehicle, the relationship between a sensor frame of interest defined by DR system 100 and a body frame defined by the corresponding vehicle in which DR system 100 is mounted is shown in FIG. 2.

The body frame $(X_B, Y_B, Z_B)$ is related to the sensor frame $(X_S, Y_S, Z_S)$ through a series of ordered rotations in yaw ($\psi$), pitch ($\alpha$), and roll ($\theta$). Rotation in yaw from the body frame gives a yawed frame (X', Y', Z'), where $Z_B$ and Z' are identical. The transformation from the body frame to the yawed frame is given as:

$$\begin{bmatrix} X_B \\ Y_B \\ Z_B \end{bmatrix} = \begin{bmatrix} \cos\psi & -\sin\psi & 0 \\ \sin\psi & \cos\psi & 0 \\ 0 & 0 & 1 \end{bmatrix} \begin{bmatrix} X' \\ Y' \\ Z' \end{bmatrix}$$

Rotation in pitch from the first intermediary reference frame gives a pitched reference frame (X", Y", Z"), where Y' and Y" are identical. The transformation from the yawed frame to the pitched frame is given as:

$$\begin{bmatrix} X' \\ Y' \\ Z' \end{bmatrix} = \begin{bmatrix} \cos\alpha & 0 & \sin\alpha \\ 0 & 1 & 0 \\ -\sin\alpha & 0 & \cos\alpha \end{bmatrix} \begin{bmatrix} X'' \\ Y'' \\ Z'' \end{bmatrix} \quad \text{Eq. 1}$$

Finally, rotation in roll from the pitched frame gives the sensor frame $(X_S, Y_S, Z_S)$, where X" and $X_S$ are identical. The transformation from the pitched frame to the sensor frame is given as:

$$\begin{bmatrix} X'' \\ Y'' \\ Z'' \end{bmatrix} = \begin{bmatrix} 1 & 0 & 0 \\ 0 & \cos\theta & -\sin\theta \\ 0 & \sin\theta & \cos\theta \end{bmatrix} \begin{bmatrix} X_S \\ Y_S \\ Z_S \end{bmatrix} \quad \text{Eq. 2}$$

It may thus be shown that the transformation from the sensor frame to the body frame is given by:

$$\begin{bmatrix} X_B \\ Y_B \\ Z_B \end{bmatrix} = \begin{bmatrix} \cos\psi & -\sin\psi & 0 \\ \sin\psi & \cos\psi & 0 \\ 0 & 0 & 1 \end{bmatrix} \begin{bmatrix} \cos\alpha & 0 & \sin\alpha \\ 0 & 1 & 0 \\ -\sin\alpha & 0 & \cos\alpha \end{bmatrix} \begin{bmatrix} 1 & 0 & 0 \\ 0 & \cos\theta & -\sin\theta \\ 0 & \sin\theta & \cos\theta \end{bmatrix} \begin{bmatrix} X_S \\ Y_S \\ Z_S \end{bmatrix}$$

which simplifies to:

$$\begin{bmatrix} X_B \\ Y_B \\ Z_B \end{bmatrix} = \begin{bmatrix} \cos\psi\cdot\cos\alpha & -\sin\psi\cdot\cos\theta+\cos\psi\cdot\sin\alpha\cdot\sin\theta & \sin\psi\cdot\sin\theta+\cos\psi\cdot\sin\alpha\cdot\cos\theta \\ \sin\psi\cdot\cos\alpha & \cos\psi\cdot\cos\theta+\sin\psi\cdot\sin\alpha\cdot\sin\theta & -\cos\psi\cdot\sin\theta+\sin\psi\cdot\sin\alpha\cdot\cos\theta \\ -\sin\alpha & \cos\alpha\cdot\sin\theta & \cos\alpha\cdot\cos\theta \end{bmatrix} \begin{bmatrix} X_S \\ Y_S \\ Z_S \end{bmatrix}$$

By inverting the previous transformation, the body frame is transformed into the sensor frame as:

$$\begin{bmatrix} X_B \\ Y_B \\ Z_B \end{bmatrix} = \begin{bmatrix} \cos\psi\cdot\cos\alpha & -\sin\psi\cdot\cos\theta+\cos\psi\cdot\sin\alpha\cdot\sin\theta & \sin\psi\cdot\sin\theta+\cos\psi\cdot\sin\alpha\cdot\cos\theta \\ \sin\psi\cdot\cos\alpha & \cos\psi\cdot\cos\theta+\sin\psi\cdot\sin\alpha\cdot\sin\theta & -\cos\psi\cdot\sin\theta+\sin\psi\cdot\sin\alpha\cdot\cos\theta \\ -\sin\alpha & \cos\alpha\cdot\sin\theta & \cos\alpha\cdot\cos\theta \end{bmatrix}^{-1} \begin{bmatrix} X_S \\ Y_S \\ Z_S \end{bmatrix}$$

Figure 3:
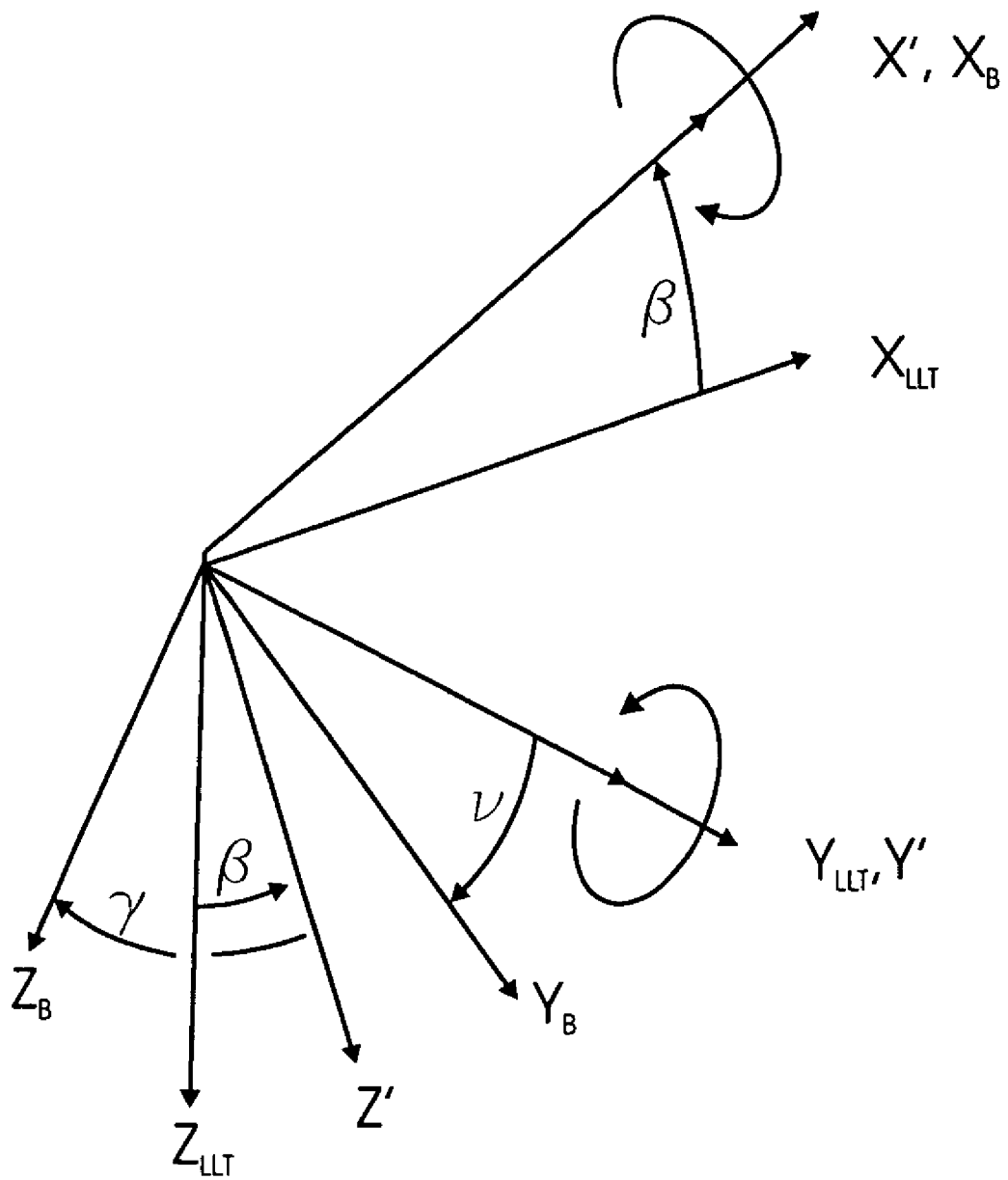
FIG. 3 illustrates the relationship between a body frame of reference and a local-level-tangent frame of reference for the DR system of FIG. 1.

In addition to these frames of reference, it is also helpful to define a local-level-tangent (LLT) frame which has its X axis aligned with the speed-over-ground (SOG) vector, its Z axis aligned with the local gravity (G) vector, and its Y axis directed normally to the X axis out the right side of the vehicle. At rest, a vehicle's body frame is thus aligned with the LLT frame. However, as the vehicle speeds up, the body will pitch (as defined by an angle $\beta$) and roll (as defined by an angle $\gamma$) with respect to the LLT frame. The relationship between the body frame and the LLT frame is illustrated in FIG. 3. The transformation from the body frame to the LLT frame is given as:

$$\begin{bmatrix} X_{LLT} \\ Y_{LLT} \\ Z_{LLT} \end{bmatrix} = \begin{bmatrix} \cos\beta & 0 & \sin\beta \\ 0 & 1 & 0 \\ -\sin\beta & 0 & \cos\beta \end{bmatrix} \begin{bmatrix} 1 & 0 & 0 \\ 0 & \cos\gamma & -\sin\gamma \\ 0 & \sin\gamma & \cos\gamma \end{bmatrix} \begin{bmatrix} X_B \\ Y_B \\ Z_B \end{bmatrix}$$

which simplifies to:

$$\begin{bmatrix} X_{LLT} \\ Y_{LLT} \\ Z_{LLT} \end{bmatrix} = \begin{bmatrix} \cos\beta & \sin\beta\cdot\sin\gamma & \sin\beta\cdot\cos\gamma \\ 0 & \cos\gamma & -\sin\gamma \\ -\sin\beta & \cos\beta\cdot\sin\gamma & \cos\beta\cdot\cos\gamma \end{bmatrix} \begin{bmatrix} X_B \\ Y_B \\ Z_B \end{bmatrix}$$

Through inversion of the preceding transformation, the LLT-to-body-frame transformation may be shown to be:

$$\begin{bmatrix} X_B \\ Y_B \\ Z_B \end{bmatrix} = \begin{bmatrix} \cos\beta & 0 & -\sin\beta \\ \sin\beta\cdot\sin\gamma & \cos\gamma & \cos\beta\cdot\sin\gamma \\ \sin\beta\cdot\cos\gamma & -\sin\gamma & \cos\beta\cdot\cos\gamma \end{bmatrix} \begin{bmatrix} X_{LLT} \\ Y_{LLT} \\ Z_{LLT} \end{bmatrix}$$

Given the sensor and body frames of reference, determining position using DR system 100 may proceed. This position determination may be simplified if the types of acceleration accounted for are limited by assuming that longitudinal acceleration for a vehicle including DR system 100 will always be tangential to the arc through which the vehicle turns. Integration of the longitudinal acceleration obtained from the accelerometers will therefore yield the speed-over-ground (SOG), which along with a turn rate obtained from the yaw gyro allows a navigation engine such as a GPS navigation system coupled to the DR system to compute a dead reckoning (DR) path.

Other assumptions may be performed as well to simplify the analysis. For example, X, Y, and Z accelerometers may be assumed to be orthogonal to each other such that mechanical misalignments are ignored. In addition, the scale factors for each of the accelerometers will be assumed to be the same and their electronic biases are assumed small and constant (and therefore ignored) or calibrated out during manufacture. The yaw gyro is assumed to be calibrated to provide accurate yaw rate information. The vehicle's roll and pitch angles are assumed small enough that the longitudinal and lateral accelerations happen within the LLT plane such that gravity does not affect these accelerations. In addition, to avoid accounting for moment-arm/coriolis effects, the GPS antenna and the DR system 100 are assumed to be collocated and also the GPS antenna and the DR system 100 are assumed to be reasonably close to the vehicle's center of rotation.

Given all or some of these assumptions, it may be assumed that, so long as a vehicle is not skidding, there are only three significant accelerations to consider: gravity (G), longitudinal ($A_X$), and lateral ($A_Y$). Because the X, Y, and Z accelerometers in the DR system are not aligned precisely (unless by chance) with the body frame, the corresponding sensor accelerations ($A_{XS}$, $A_{YS}$, and $A_{ZS}$, respectively) will generally not be equal to the $A_X$, $A_Y$, and $A_Z$ (G) accelerations. However, the magnitude of the total acceleration is the same such that $$G^2 + A_X^2 + A_Y^2 = A_{Xs}^2 + A_{Ys}^2 + A_{Zs}^2 \quad \text{Eq. (3)}$$

Measurements from each accelerometer 105 are subject to a number of errors.

For example, errors may arise due to inaccuracies in the analog-to-digital conversion of analog acceleration data. Thus, each sensor acceleration may be modeled as:

$$Accel_{Meas} = Accel_{True} \cdot ScaleFactor + ElectronicBias$$

As discussed above, the following analysis will assume that the effect of the electronic biases is smaller than the scale factors' effect such that the electronic biases may be ignored or may be calibrated out during manufacturing. Factory bias calibration is typically performed by orienting an accelerometer such that it points straight down (giving a maximum negative reading) and then such that it points straight up (giving a maximum positive reading). Bias is provided by averaging these two measurements. Given the above definitions of frames of reference and the X, Y, and Z accelerometers, it will now be demonstrated that sensed accelerations from these accelerometers may be used to determine the yaw, pitch, and roll angles between the body frame of reference and the sensor frame of reference. Given these angles, it will further be demonstrated that the longitudinal acceleration for the vehicle may be determined using sensed accelerations from the accelerometers. As known in the dead reckoning arts, the longitudinal acceleration may then be double integrated with respect to a heading to determine position. The heading may be determined using, for example, compass or a yaw-rate gyroscope. The following calculations may be determined by a processor 135 or other suitable calculation engine already present in the vehicle's GPS navigation system or by a separate processor.

To begin the discussion of the longitudinal acceleration calculation, it may be seen from Equation 3 that, assuming $A_X$ and $A_Y$ are zero, which would be the case if the vehicle is stationary or un-accelerated (traveling in a straight line at a constant velocity), the scale factor is given by:

$$ScaleFactor = \left( \frac{\sqrt{A_{Xs}^2 + A_{Ys}^2 + A_{Zs}^2}}{G} \right)_{A_X = A_Y = 0} \quad \text{Eq. (4)}$$

Having obtained the scale factor, the estimated accelerations in the sensor frame are given by:

$$SensorAccel_{Estimated} = SensorAccel_{Measured} \cdot ScaleFactor$$

Having corrected for the scale factor, the following discussion will assume that the set of sensor accelerations ($A_{XS}$, $A_{YS}$, and $A_{ZS}$) refers to the scale-factor-corrected estimated accelerations, not the raw measured accelerations without scale factor correction. Using the estimated accelerations, the pitch and roll angles ($\alpha$ and $\theta$, respectively) may be determined as follows. If the vehicle is at rest or un-accelerated, it follows that:

$$A_{Xs} = G \cdot \sin \alpha$$

which yields $$\sin \alpha = \left( \frac{A_{Xs}}{G} \right)_{V_x = 0} \quad \text{Eq. 5}$$

Similarly, the rest or unaccelerated vehicle condition also leads to $$A_{Ys} = -G \cdot \cos \alpha \cdot \sin \theta$$

which yields $$\sin \theta = \left[ \frac{-A_{Ys}}{G \cdot \cos \alpha} \right]_{V_x = 0}$$

which, by substituting in the previously determined value for $\sin \alpha$, yields $$\sin \theta = \left( \frac{-A_{Ys}}{G \cdot \sqrt{1 - \sin^2 \alpha}} \right)_{V_x = 0} \quad \text{Eq. 6}$$

Equations 1 and 2 give the transformation from the sensor frame to the yawed frame as $$\begin{bmatrix} X' \\ Y' \\ Z' \end{bmatrix} = \begin{bmatrix} \cos \alpha & 0 & \sin \alpha \\ 0 & 1 & 0 \\ -\sin \alpha & 0 & \cos \alpha \end{bmatrix} \begin{bmatrix} 1 & 0 & 0 \\ 0 & \cos \theta & -\sin \theta \\ 0 & \sin \theta & \cos \theta \end{bmatrix} \begin{bmatrix} Xs \\ Ys \\ Zs \end{bmatrix}$$

which results in $$\begin{bmatrix} X' \\ Y' \\ Z' \end{bmatrix} = \begin{bmatrix} \cos \alpha & \sin \alpha \cdot \sin \theta & \sin \alpha \cdot \cos \theta \\ 0 & \cos \theta & -\sin \theta \\ -\sin \alpha & \cos \alpha \cdot \sin \theta & \cos \alpha \cdot \cos \theta \end{bmatrix} \begin{bmatrix} Xs \\ Ys \\ Zs \end{bmatrix} \quad \text{Eq. (7)}$$

By using equations 5 and 6 in combination with equation 6, the yawed frame accelerations ($A_{X'}$, $A_{Y'}$, and $A_{Z'}$) may be obtained.

If the vehicle is accelerating without turning ($\omega = 0$), it may be seen from FIG. 2 that the following relationships hold:

$$A_{X'\omega=0} = A_X \cos \Psi_{\omega=0}$$

$$A_{Y'\omega=0} = -A_X \sin \Psi_{\omega=0}$$

It then follows from the preceding expressions that the yaw angle is given by:

$$\Psi = \tan^{-1}(-A_Y/A_X)_{\omega=0} \qquad \text{Eq. (8)}$$

To make the arctangent function a full-four-quadrant function, the values of $A_Y$ and $A_X$ may each be divided by the longitudinal acceleration determined by the GPS navigation system ($A_{Xref}$) before the arctangent function is calculated.

Having thus calculated the yaw, pitch and roll angles, the GPS navigation system may determine the longitudinal acceleration ($A_{XB}$) (as well as the lateral acceleration and Z-directed acceleration) using the transformation $$\begin{bmatrix} A_{X_B} \\ A_{Y_B} \\ A_{Z_B} \end{bmatrix} = \begin{bmatrix} \cos\Psi\cdot\cos\alpha & -\sin\Psi\cdot\cos\theta + \cos\Psi\cdot\sin\alpha\cdot\sin\theta & \sin\Psi\cdot\sin\theta + \cos\Psi\cdot\sin\alpha\cdot\cos\theta \\ \sin\Psi\cdot\cos\alpha & \cos\Psi\cdot\cos\theta + \sin\Psi\cdot\sin\alpha\cdot\sin\theta & -\cos\Psi\cdot\sin\theta + \sin\Psi\cdot\sin\alpha\cdot\cos\theta \\ -\sin\alpha & \cos\alpha\cdot\sin\theta & \cos\alpha\cdot\cos\theta \end{bmatrix} \begin{bmatrix} A_{Xs} \\ A_{Ys} \\ A_{Zs} \end{bmatrix} \qquad \text{Eq. (9)}$$

As discussed previously, it was presumed that the X, Y, and Z accelerometers are orthogonal to each other. In addition, the scale factors were presumed to be all equal. Moreover, the biases were ignored as well. In reality, the accelerometers will generally not be perfectly orthogonal to each other. Moreover, the scale factors may differ and the biases may not be insignificant. All these effects may be accounted for in the following fashion. If the vehicle is at rest or un-accelerated, a reference longitudinal acceleration $A_{Xref}$ that may be calculated by, for example, a GPS navigation system will be very close to zero (such as less than or equal to 0.01 m/s²). In such a case, the longitudinal acceleration A×B determined using equation 9 should also be close to zero. However, because of the effects just discussed, AXB may have a zero offset (ZeroOffset) that may be determined as follows if the vehicle is at rest or un-accelerated:

$$\text{ZeroOffset} = A_{X_B} - A_{X_{ref}}$$

Conversely, when the reference longitudinal acceleration is not zero, a longitudinal scale factor (LongitudinalScaleFactor) may be determined using the expression:

$$LongitudinalScaleFactor = \frac{(A_{X_B} - ZeroOffset)}{A_{X_{ref}}}$$

Thus, the sensor-derived longitudinal acceleration from equation 9 may be adjusted to give a corrected sensor-derived longitudinal acceleration $A_{XBcorrected}$ as follows:

$$A_{XBcorrected} = \frac{(A_{X_B} - ZeroOffset)}{LongitudinalScaleFactor} \qquad \text{Eq. (10)}$$

Consider the advantages of determining $A_{XBcorrected}$ as just described. Should a vehicle lose GPS navigation ability, DR system 100 may continue to provide position updates. Although the accuracy of such DR updates will deteriorate over time, the periods of GPS signal absence are typically one minute of less such that DR system 100 adequately maintains position updates.

It will be appreciated that dead reckoning may be performed using $A_{XBcorrected}$ without the need for a yaw gyro. For example, heading information may be obtained from other means such as, for example, a compass. The preceding determination of $A_{XBcorrected}$ may be summarized as follows with regard to the flowchart shown in FIG. 4. In a first step 400, the accelerometer scale factor is calculated as discussed with regard to equation 4. In a second step, the pitch and roll angles between the sensor frame and the vehicle body frame are calculated as discussed with regard to equations 5 and 6. Both steps 400 and 405 may be performed with the vehicle either stationary or in an unaccelerated state (constant velocity with no turning). To determine the yaw angle, the vehicle should be accelerated with no turning. During such an acceleration, the sensed accelerations are converted to the yaw frame as discussed with regard to equation 7 in step 410. The yaw angle between the sensor frame and the body frame may then be calculated in step 415 as discussed with regard to equation 8. It will be appreciated that steps 400 through 420 may be repeated whenever the vehicle movement satisfies the required conditions or periodically. If the vehicle loses GPS navigation, the corrected longitudinal acceleration may then be determined in step 420 as discussed with regard to equations 9 and 10. Finally, the position may then be updated in step 425 using conventional dead reckoning calculations based upon the corrected longitudinal acceleration and heading information. The heading may be derived from the yaw rate gyro or through alternate means such as a compass.

Figure 4:
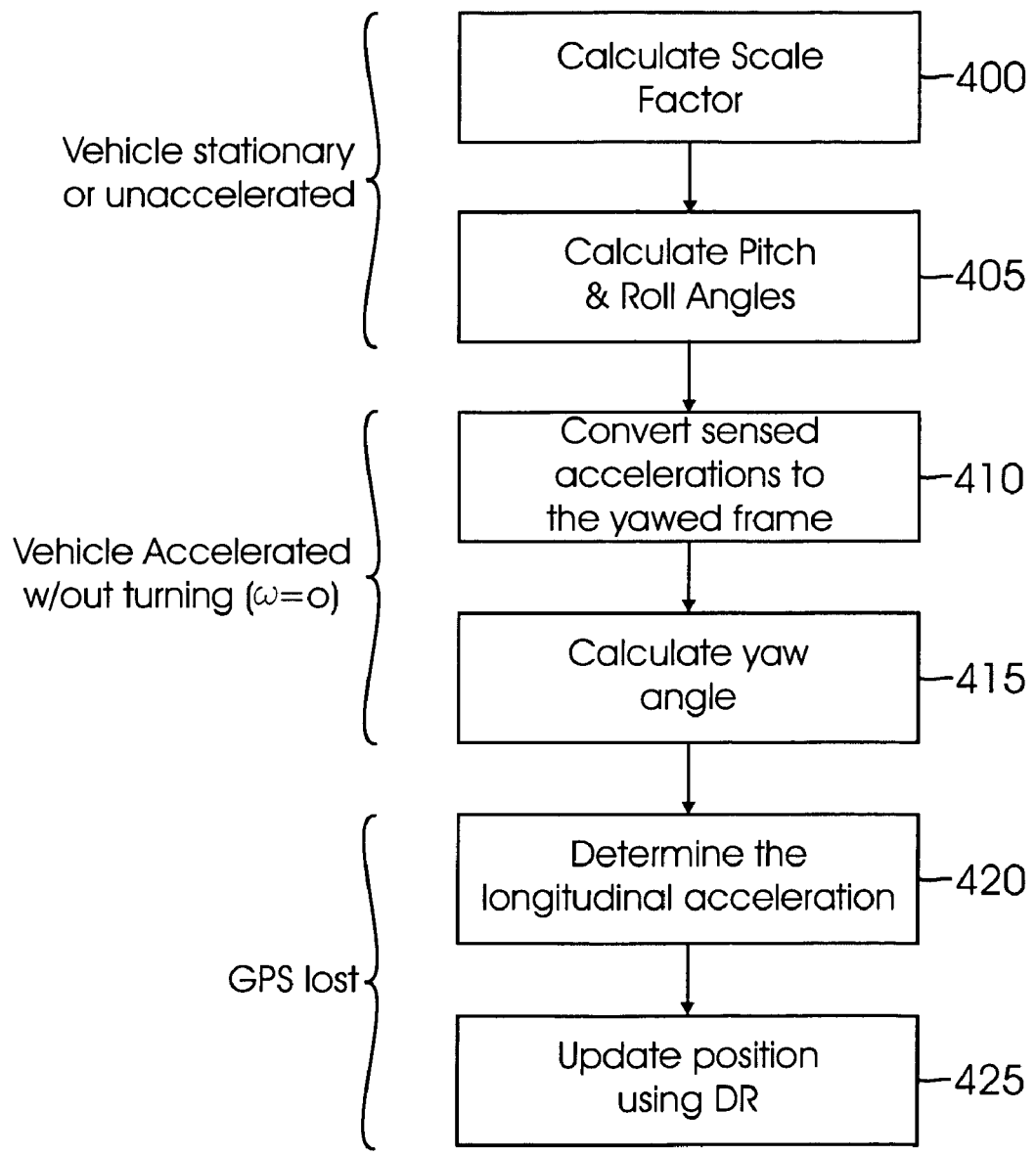
FIG. 4 is a flowchart of an exemplary dead reckoning calculation in accordance with an embodiment of the invention.

In another embodiment, the calculation of the yaw angle discussed with regard to step 415 of FIG. 4 may be modified to include a calculation of the longitudinal acceleration as determine through dead reckoning. This calculated longitudinal acceleration may then be compared to the reference longitudinal acceleration $A_{Xref}$ derived from the GPS navigation system. Through a statistical analysis such as a two-stage Kalman filter of the difference between the calculated longitudinal acceleration and the reference longitudinal acceleration, a vehicle-accelerated-without-turning estimation may be made for the scale factor and the bias factor (both assumed equal across all the accelerometers). When GPS is lost, the longitudinal acceleration may then be calculated through an appropriate manipulation of the calculations leading to equation (10) in view of the Kalman-filter-determined scale factor and bias factor.

Consider the advantages of the disclosed dead reckoning calculations—suitable accelerometers (and yaw-rate gyro if implemented) are relatively inexpensive and may be readily integrated into an existing GPS navigation unit. This unit may then be mounted into a vehicle without any expensive modification to allow a sensing/coupling of the vehicle's speedometer because no speedometer measurements are necessary. The GPS navigation unit may then update a graphical representation of the vehicle's position during periods of GPS satellite signal unavailability with the dead-reckoning-determined vehicle position. In addition, no expensive alignment of the accelerometers need be performed with the vehicle. It will be appreciated, however, that the dead reckoning calculations discussed herein may be practiced using a speedometer reading if such a coupling is available.

While certain aspects of the positioning system are presented below in certain claim forms, the inventors contemplate the various aspects of the positioning system in any number of claim forms. For example, heading need not be determined using a gyroscope. Instead, other means of obtaining heading information such as through a magnetic compass may also be used. Regardless of how heading is obtained, the present invention advantageously provides a DR capability without requiring odometer readings or sophisticated accelerometer alignment. Accordingly, the inventors reserve the right to add additional claims after filing the application to pursue such additional claim forms for other aspects of the positioning system.

What is claimed is:

1. A method of dead reckoning navigation for a vehicle using a plurality of accelerometers, comprising:
    determining an orientation between the sensor frame of reference and a body frame of reference for the vehicle using sensed accelerations from the accelerometers; and
    determining a dead-reckoning longitudinal acceleration for the vehicle by converting sensed accelerations from the accelerometers according to the determined orientation between the sensor frame of reference and the body frame of reference, wherein determining the orientation of the vehicle comprises:
    with the vehicle in a state selected from the set consisting of a stationary state and an un-accelerated state, calculating a pitch angle and a roll angle between the sensor frame of reference and a body frame of reference for the vehicle using sensed accelerations from the accelerometers; and
    with the vehicle accelerated without turning, calculating a yaw angle between the sensor frame and the body frame using sensed accelerations from the accelerometers.

2. The method of claim 1, further comprising:
    sensing a heading for the vehicle; and
    integrating the dead-reckoning longitudinal acceleration according to the heading to provide a dead-reckoning-determined location for the vehicle.

3. The method of claim 1, wherein determining the dead-reckoning longitudinal acceleration comprises converting sensed accelerations from the accelerometers according to the roll, pitch, and yaw angles.

4. The method of claim 3, wherein determining the pitch and roll angles comprises:
    with the vehicle in the state selected from the set consisting of a stationary state and an unaccelerated state, calculating a scale factor for the accelerometers; and
    converting the sensed accelerations according to the scale factor into accelerations according to a yawed frame of reference.

5. The method of claim 4, wherein calculating the yaw angle is a function of a longitudinal acceleration in the yawed frame of reference and a lateral acceleration in the yawed frame of reference.

6. The method of claim 5, wherein the function comprises calculating an arc-tangent of a ratio of the longitudinal acceleration in the yawed frame of reference and the lateral acceleration in the yawed frame of reference.

7. The method of claim 6, further comprising:
    with the vehicle accelerated without turning, sensing a reference longitudinal acceleration for the vehicle using a GPS system; and
    scaling the ratio according to the reference longitudinal acceleration before calculating the arc tangent.

8. The method of claim 1, wherein determining the dead-reckoning longitudinal acceleration further comprises:
    determining a reference longitudinal acceleration for the vehicle using a GPS system;
    comparing the reference longitudinal acceleration for the vehicle to the dead-reckoning longitudinal acceleration to obtain a scale factor and a bias for each of the accelerometers; and
    converting the sensed accelerations according the scale factor and the bias to provide a corrected dead-reckoning longitudinal acceleration.

9. The method of claim 8, wherein the comparing act comprises kalman filtering a difference between the reference longitudinal acceleration for the vehicle and the dead-reckoning longitudinal acceleration.

10. A vehicle navigation system, comprising:
    a set of accelerometers operable to sense accelerations for the vehicle according to a sensor frame of reference;
    a GPS navigation system operable to determine a reference longitudinal acceleration for the vehicle; and
    a processor operable to calculate a pitch angle and a roll angle between the sensor frame of reference and a body frame of reference for the vehicle using sensed accelerations from the accelerometers with the vehicle in a state selected from the set consisting of a stationary state and an un-accelerated state and to calculate a yaw angle between the sensor frame and the body frame using the senses accelerations with the vehicle accelerated without turning, the processor being further operable to convert the sensed accelerations according to the pitch angle, the roll angle, and the yaw angle to provide converted accelerations and to calculate a dead-reckoning longitudinal acceleration for the vehicle using the converted accelerations.

11. The vehicle navigation system of claim 10, further comprising:
    a heading sensor for the vehicle, wherein the processor is further operable to integrate the dead-reckoning longitudinal acceleration according to a heading sensed by the heading sensor to calculate a dead-reckoning-determined location for the vehicle.

12. The vehicle navigation system of claim 11, wherein the heading sensor is a yaw-rate gyroscope.

13. The vehicle navigation system of claim 11, wherein the GPS navigation system is integrated with the set of accelerometers and the heading sensor.

14. The vehicle navigation system of claim 10, wherein the GPS navigation system is adapted to provide a graphical representation of a location for the vehicle according to the dead-reckoning-determined location if GPS satellite signal reception is unavailable.

* * * * *